Jan. 10, 1950     E. T. J. TAPP     2,494,013
TELESCOPIC VEHICLE BODY
Filed May 17, 1948     6 Sheets-Sheet 2
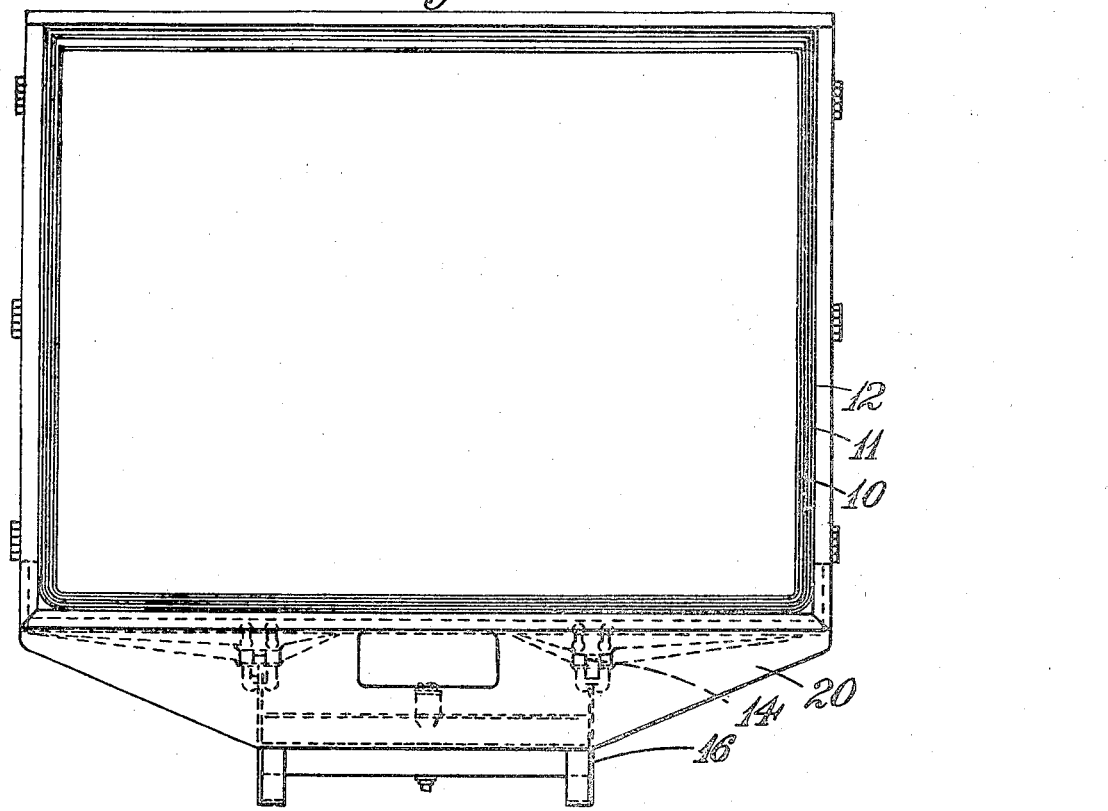
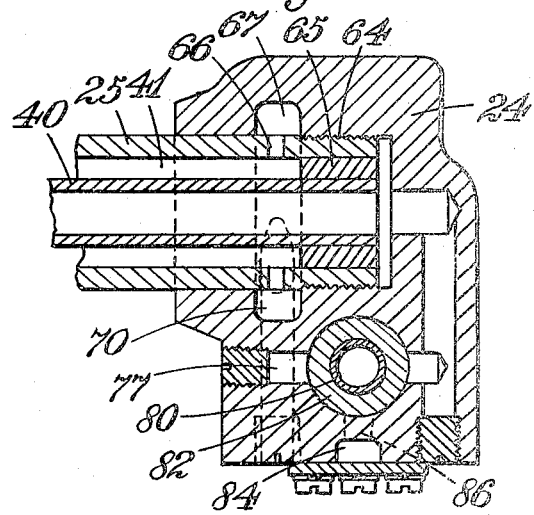
INVENTOR
EARNEST T. J. TAPP
BY Wilkinson & Mawhinney
ATTORNEYS

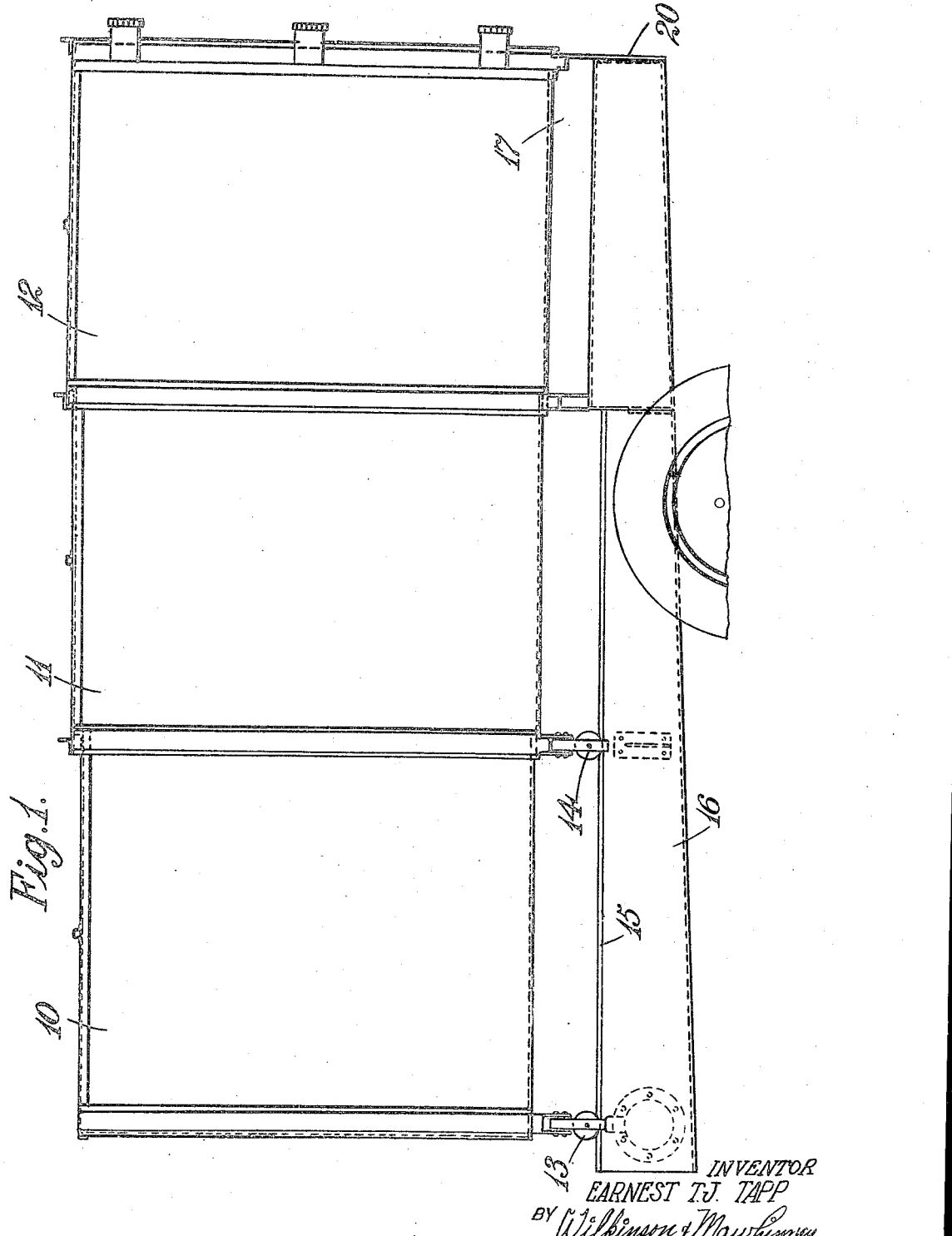

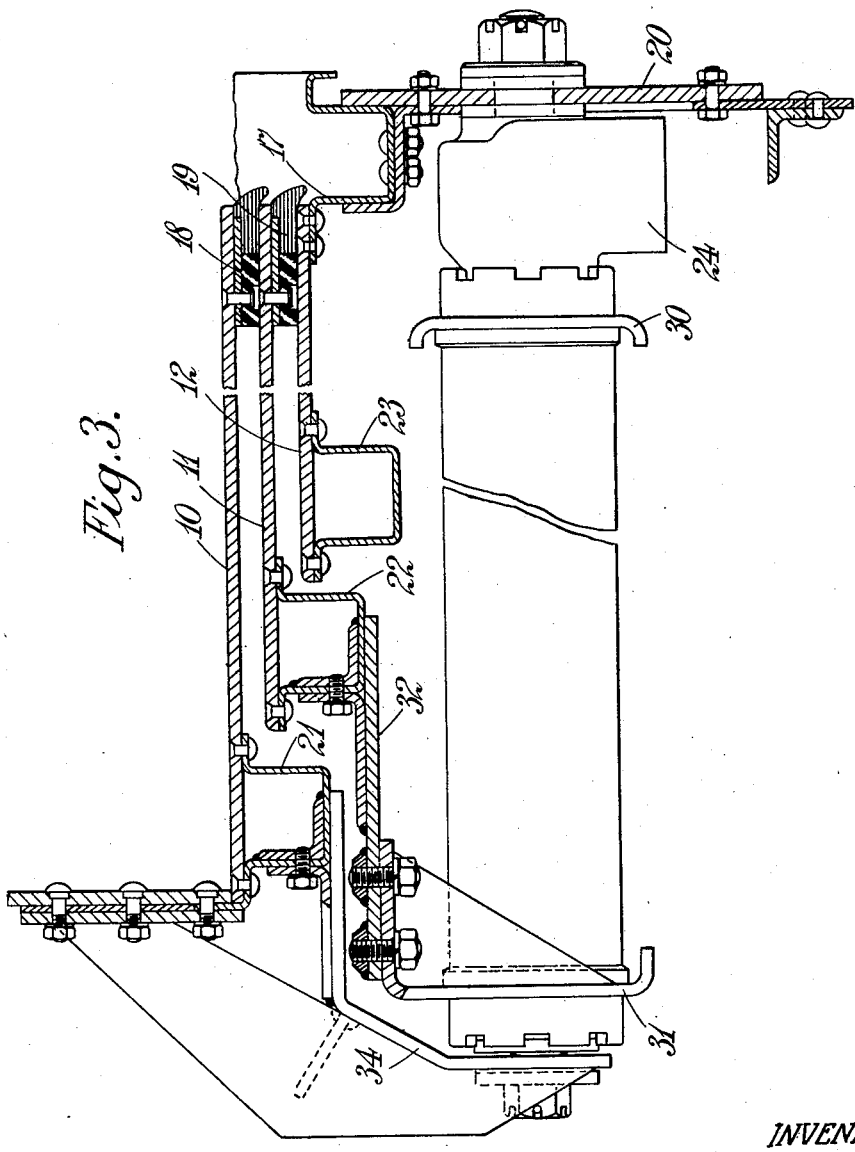

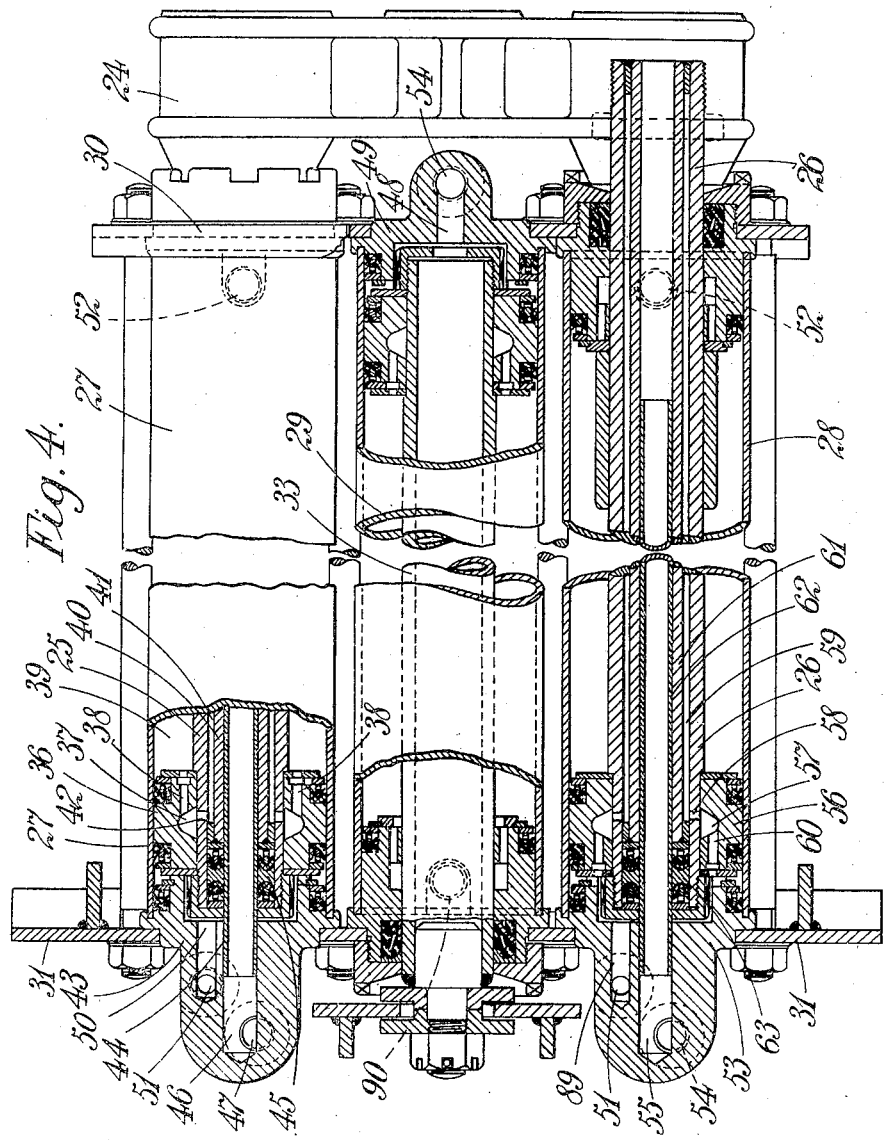

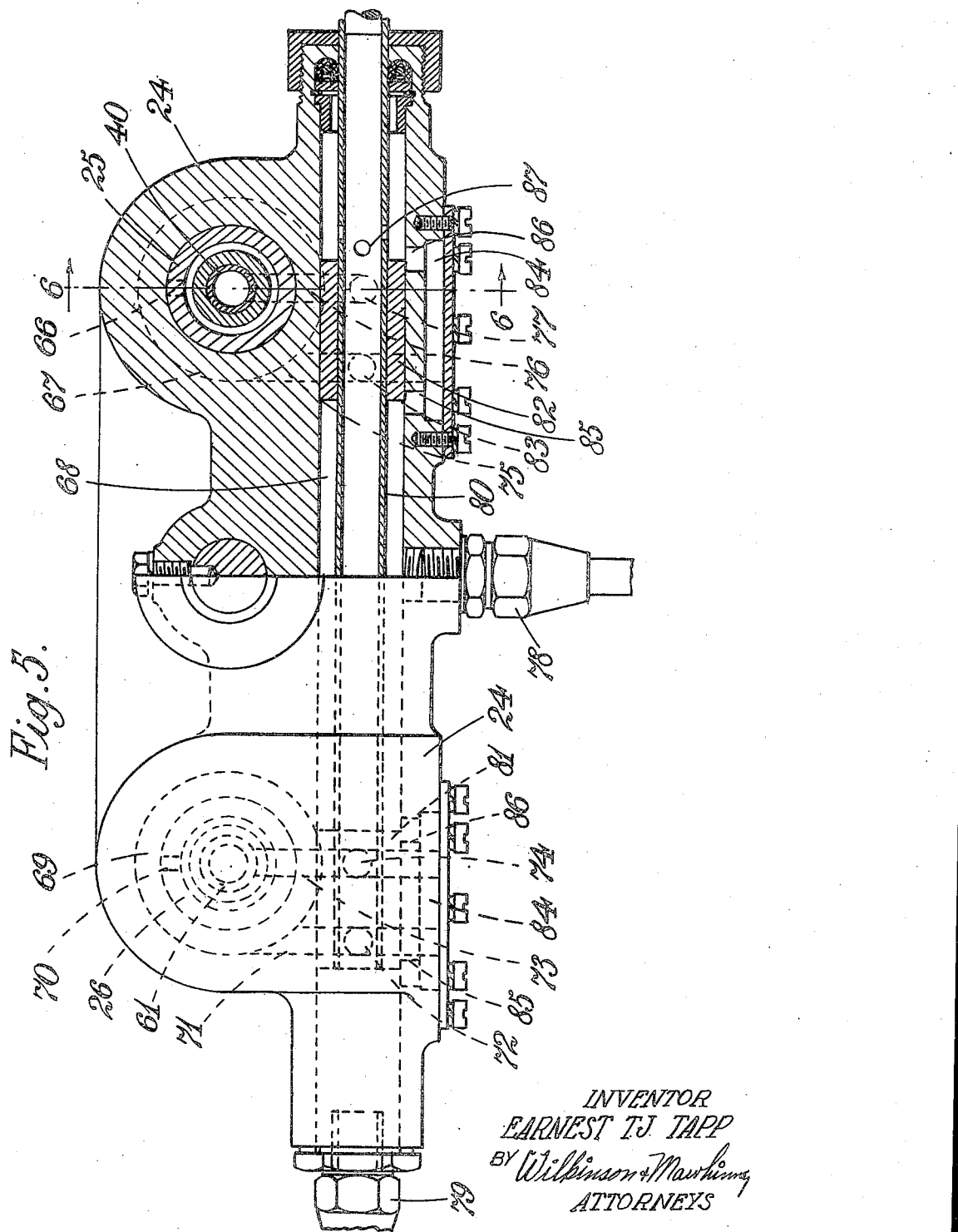

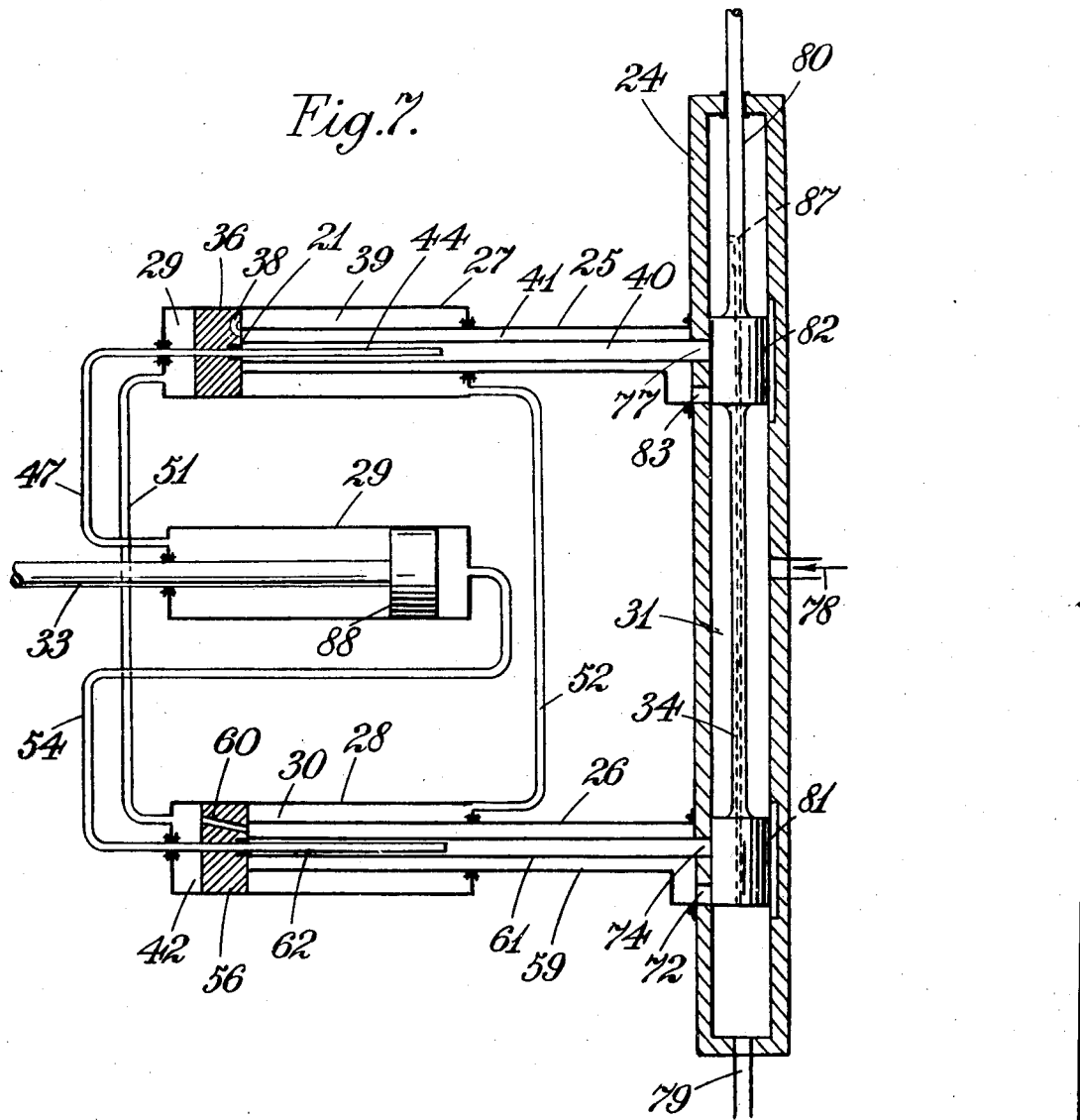

Patented Jan. 10, 1950

2,494,013

UNITED STATES PATENT OFFICE 2,494,013

TELESCOPIC VEHICLE BODY

Ernest Thomas James Tapp, Hampshire, England, assignor to Walker and County Cars Limited, London, England, a British company Application May 17, 1948, Serial No. 27,557
In Great Britain April 19, 1948

11 Claims. (Cl. 214—83.24)

This invention relates to telescopic vehicle bodies of the kind in which a number of body sections are so dimensioned and so movably mounted on the chassis frame that they may be moved into and out of nested relationship with one another, whereby the depth of the compartment in a fore-and-aft direction may be varied, and of the kind in which said movement is effected by a system of valve-controlled hydraulic ram systems associated with the body sections. An object of the present invention is to simplify the arrangement of and the control of the hydraulic systems.

According to this invention, a telescopic body for a vehicle comprises a number of body sections adapted to nest within one another, a mounting for said body sections constraining certain of them to move along the vehicle chassis, a number of hydraulic ram systems arranged side by side and each having relatively movable cylinder and plunger parts and having one part of each of two adjacent systems interconnected to move together while the other parts of the two systems are fixed respectively in relation to the two body sections.

For example, the combination of the hydraulic ram systems may have a free part of one system attached to a fixed part of the chassis and a free part of another system conected to that body section which is to be moved furthest. Preferably, the cylinders of two ram systems are interconnected to move together, and a plunger of another systems is connected to that body section which is to be moved furthest.

In the case where the telescopic body comprises three body sections, one of them being fixed to the chassis and the other two being constrained to move along the chassis, two hydraulic ram systems are provided having one part of one ram system so connected with a part of the other ram system that they move together, and one of the two other parts connected to the chassis, while the other is connected to the body section which is to be moved furthest.

In a preferred arrangement, the cylinders of the two ram systems are connected to the intermediate body section and the plunger of one system is connected to the body section which is to be moved furthest, and the plungers of the other system is connected to a fixed part of the chassis.

Other features of the invention are set out in the accompanying claims and in the following description, in which:

Figure 1 is a side elevation of a part of the vehicle chassis showing three body sections telescopically mounted thereon, Figure 2 is an end elevation looking from the right of Figure 1, Figure 3 is a part vertical section and elevation through a portion of the right-hand end of Figure 1, showing the hydraulic ram operating mechanism, Figure 4 is a part horizontal section and part plan of the hydraulic ram mechanism, Figure 5 is a part vertical section and part end view of the valve mechanism controlling the hydraulic ram, Figure 6 is a section on the line 6—6 of Figure 5, and Figure 7 is a diagrammatic view of the hydraulic rams and their connections.

Figure 1 shows three body sections 10, 11 and 12, each of rectangular configuration, so dimensioned that they may telescope one within the other, as indicated in Figure 3. The two smaller body sections 10 and 11 are provided at their forward ends with pairs of flanged rollers 13 and 14 which engage rails 15 attached to the chassis frame members 16. The largest of the body sections 12 is fixed to a part 17 of the chassis frame. As will be seen from Figure 3, the walls of the body sections 10 and 11 have secured to the outside thereof at the rear ends rubbing strips 18 and 19 respectively, which space apart the walls of adjacent body sections. An end plate 20 is secured across the rear ends of the chassis frame members 16. Secured beneath the front edge of the bottom wall of each of the body sections 10, 11 and 12 are channel-shaped cross members 21, 22 and 23 respectively. The latter cross member is fixed to the chassis frame. Secured to the end plate 20 is a rigid valve casing 24 to which are anchored two hollow thrust rods 25 and 26 (see Figure 4 and 6) associated with hydraulic ram cylinders 27, 28, which cylinders are arranged one on either side of a third hydraulic ram cylinder 29. The ram cylinders are connected together by end plates 30 and 31. It will be noted from Figure 3 that the end plate 31 is connected to a plate 32 with the channel-shaped member 22 at the front end of the centre body section 11. The thrust rod 33 associated with the centre cylinder 29 (Figure 4) has connected to it a plate 34 (Figure 3) which is secured to the channel-shaped member 21 fixed to the front of the body section 10.

Referring again to Figure 4, the hollow thrust rod 25 has secured to it a piston 36 having a circumferential groove 37 on its inner periphery communicating through small passages 38 with the space 39 on one side of the piston between the hollow thrust rod 25 and the wall of the cylinder 27. Fixed within the hollow thrust rod 25 is one part 40 of a telescopic tube, which part is of such a size as to leave a space 41 between it and the thrust rod 25. The space 41 communicates with the circumferential groove 37 through ports 42. A cover plate 43 has fixed to it the other part 44 of the telescopic tube which is arranged to slide in the part 40 and passes through a gland 45 formed at the end of the hollow thrust rod 25. The part 44 of the telescopic tube communicates with a space 46 in the cover plate which in its turn communicates through a conduit 47 with a port 90 in the left-hand end of the cylinder 29. The cover plate 43 is formed with a second space 50 which communicates through a conduit 51 with a space 89 in the cover plate 53 at the left-hand end of the cylinder 28, and the right-hand end of the cylinder 27 communicates through a conduit 52 with the right-hand end of the cylinder 28. The right-hand end of the cylinder 29 is provided with a cover plate 49 having a space 48 connected by a conduit 54 with a space 55 in the cover plate 53 at the left-hand end of the cylinder 28. The hollow thrust rod 26 in the cylinder 29 has secured to it a piston 56 of a similar character to 36 having a circumferential groove 57 on its inner periphery which communicates through a port 58 with the space 59 within the hollow push rod. In this instance, the annular groove 57 communicates through small passages 60 with the left-hand side of the piston. Fixed within the hollow thrust rod is one part 61 of a telescopic tube, the other part 62 of which is fixed to the cover-plate 53 and communicates with the space 55. The telescopic part 62 passes through a gland 63 fixed in the hollow thrust rod 61.

The hollow thrust rods 25 and 26, as hereinbefore indicated, are secured to a stout valve casing 24 which in its turn is fixed to the vehicle chassis. The valve casing is thus arranged to take the full operating thrust and also serves to space the ram systems the required distance apart.

Referring to Figures 5 and 6, it will be noted that the end of the thrust rod 25 is in screw-threaded engagement at 64 with the valve casing 24 and the telescopic tube part 40 is spaced away from the hollow thrust rod 25 by a spacing sleeve 65. The space 41 between the telescopic tube part 40 and thrust rod 25 communicates through a port 66 with an annular passage 67 formed within the valve casing. As will be seen from Figure 5, the valve casing is provided with a cylindrical bore 68 extending along the length thereof and across the width of the whole ram system. The hollow thrust rod 26 and the part 61 of the telescopic tube are fixed in the valve casing in a like manner to that described with reference to the hollow thrust rod 25 and telescopic tube part 40, and a port 70 in the thrust shaft 26 communicates with an annular passage 69 in the valve casing. The annular passage 69 communicates through a passage 71 in the valve casing with a port 72 in the aforesaid bore 68, and the end of the telescopic tube part 61 communicates at its end with a passage 73 in the valve casing which in its turn communicates with a port 74 in said bore 68. Similarly, the annular passage 67 communicates through a passage 75 with a port in the bore 68 and the end of the telescopic tube part 40 communicates through a passage 76 with a port 77 in said bore. The centre part of the bore communicates through a connection 78 with the high pressure side of a pressure generator, and the left-hand end of the bore communicates through a connection 79 with the low pressure side of the hydraulic system. Extending through the hollow bore is a hollow valve control rod 80 which has secured to it two cylindrical valve control members 81 and 82 so disposed as to be capable of controlling the ports 72, 74 and 83, 77 opposite the locality of each valve 81, 82. The wall of the valve casing 24 is provided with a chest 84 having ports 85, 86 which, when the valve members 81 and 82 are in neutral position, effect a by-pass so as to prevent the build-up of pressure on either side of the valve member. The hollow valve control rod 80 is provided with a port 87 therein to the right of the valve control member 82.

Referring now to Figure 7 in which the valve is shown in a neutral position, assuming the body sections are nested together and it is required to move the innermost body section 10 out of the body section 11, the valve control member 80 is moved in a downward direction in the figure until the upper edge of the valve 81 uncovers the port 74 and the upper edge of 82 uncovers the port 77. Under these conditions, fluid under pressure will pass up the telescopic pipe 61, 62 and through the conduit 54 to the right-hand end of the cylinder 29 acting on the piston 88 connected to the thrust rod 33 which forces the inner body section outwardly. The fluid to the left of the piston 88 will pass through the conduit 47 and thence through the telescopic pipes 40 to the right of the valve member 82 and then through the port 87 in the valve control member along the hollow interior thereof to the outlet connection 79. If it is now desired to move the body section 11 out of the body section 12, the valve control members move further downward in Figure 7 until the edges of the piston members 31 and 82 uncover the ports 72 and 83 respectively. Under these conditions, fluid under pressure will flow to the space 59 between the thrust rod 26 and the telescopic pipe 61 through the passage 60 in the piston 56 into the space to the left of the piston, and thence through the conduit 27 through the space to the left of the piston 26. The two cylinders 27 and 28 are thus forced to the left carrying with them the body section 11. The fluid to the right of the pistons 56 and 36 in the former case pass through the conduit 52 and then through the passage 38 into the space 41 between the hollow thrust rod 25 and the telescopic pipe 40. The fluid then passes into a space above the valve member 82 through the port 87 and the hollow valve control rod to the exhaust 79. In order to retract the body sections, the valve control member is moved upwardly from the neutral position shown in Figure 7 and the connections to various ports can thus cause the piston 88 to be moved to the right of the cylinder withdrawing the body section 10, and further movement upwardly causes the cylinders 27 and 28 to be moved to the right causing the body sections to be fully nested.

I claim:

1. A vehicle having a telescopic body comprising three body sections adapted to nest within one another, one of which is fixed to the chassis, a mounting for the others constraining them to move along the chassis, two hydraulic ram systems, one comprising two cylinders and plungers having hollow thrust rods, which hollow rods communicate with the cylinder space on one side of the plunger in one ram system and on the opposite side of the plunger in the other system, and the corresponding ends of which cylinders are interconnected, and which other ram system comprises a single cylinder and plunger, which three cylinders of the two systems are so connected as to move together, means connecting the plungers of the first system to the chassis and means connecting the plunger of the second system to that body section which is to be moved furthest, and valve control means adapted to connect the two hollow thrust rods to high and low pressure sides of a hydraulic pressure system or vice versa and also adapted to connect opposite ends of the cylinder of the second system alternatively to said high and low pressure sides.

2. A vehicle having a telescopic body comprising three body sections adapted to nest within one another, one of which is fixed to the chassis, a mounting for the others constraining them to move along the chassis, two hydraulic ram systems, one comprising two cylinders and plungers having hollow thrust rods, which hollow rods communicate with the cylinder space on one side of the plunger in one ram system and on the opposite side of the plunger in the other system, and telescopic pipes extending through the two hollow thrust rods and plungers and connected to the opposite ends of the cylinders of the second system and means for connecting together the corresponding ends of the two cylinders of the first system and valve control means adapted to connect the spaces between the telecsopic pipes and hollow thrust rods with high and low pressure sides of a hydraulic pressure system or vice versa and similar means to connect the telescopic pipes to said high and low pressure sides.

3. A vehicle having a telescopic body comprising three body sections adapted to nest within one another, one of which is fixed to the chassis, a mounting for the others constraining them to move along the chassis, two hydraulic ram systems, at least one of which comprises two cylinders and two plungers having hollow thrust rods, a strong valve casing having two control ports and inlet and outlet ports for connection with the high and low pressure sides of a pressure generating system, means for rigidly connecting the hollow thrust rods to the valve casing so as to communicate with the control ports, conduits connecting said two cylinders to opposite ends of a cylinder of the other ram system, a plunger in that system connected to that body section which is to be moved furthest, valve means in that casing which is adapted to place the inlet port into communication with either hollow thrust rod and the outlet port in communication with the other hollow thrust rod.

4. A vehicle having a telescopic body comprising three body sections adapted to nest within one another, one of which is fixed to the chassis, a mounting for the others constraining them to move along the chassis, two hydraulic ram systems, one comprising two cylinders and plungers and the other comprising a single cylinder and plunger, which plungers of the first system have hollow thrust rods communicating with the cylinder space on one side of the plunger of one system and with the opposite side of the plunger in the other ram, and the corresponding ends of which cylinders are interconnected, and which three cylinders are so connected as to move together, means connecting the ram of the second system to that body section which is to be moved furthest, a valve casing having ports therein controlled by an adjustable valve member, and means connecting said two hollow thrust rods to said valve casing so as to communicate with certain of said ports, means connecting said valve casing to the chassis, which valve casing and valve members are adapted to connect the two hollow thrust rods to high and low pressure sides of a hydraulic system or vice versa and also adapted to connect opposite ends of the cylinder of the second system alternatively to said high and low pressure sides.

5. A vehicle having a telescopic body comprising three body sections adapted to nest within one another, one of which is fixed to the chassis, a mounting for the others constraining them to move along the chassis, two hydraulic ram systems, one comprising two cylinders and plungers and the other comprising a single cylinder and plunger, which plungers of the first system have hollow thrust rods communicating with the cylinder space on one side of the plunger of one system and with the opposite side of the plunger in the other system, and the corresponding ends of which cylinders are interconnected, telescopic tubes arranged to extend through each hollow thrust rod and plunger, which telescopic tubes are connected to opposite ends of the cylinder of the second system, which three cylinders of the two systems are so connected that they move together, means connecting the plunger of the second system to that body section which is to be moved furthest, a valve casing having ports communicating with the two telescopic pipes and with the spaces between the telescopic tubes and the hollow thrust rods, two valve control members spaced apart and fixed on a rod within the casing and reciprocal in the cylinder, an inlet port in the valve casing disposed between the two valve control members, an exhaust port in the casing communicating with spaces in the casing beyond each piston, which two pistons and two pairs of ports are so disposed that movement of the piston in one direction causes one telescopic tube to communicate with the source of pressure and the other with the exhaust, while the ports communicating with the space between the telescopic tubes in the hollow thrust rods are blocked by the valve control members while further movement opens the latter port, and movement in the opposite direction from a central position reverses the connection of the telescopic tubes and the spaces between them and the hollow thrust rods 6. A vehicle having a telescopic body comprising a number of body sections adapted to nest within one another, a mounting for said body sections constraining certain of them to move along the vehicle chassis and securing one of them against movement, a number of hydraulic rams arranged side by side and symmetrically disposed with respect to a fore-and-aft control vertical plane through said body sections and so connected to them as to apply a resultant force to each movable body section in said vertical plane.

7. A vehicle having a telescopic body comprising a number of body sections adapted to nest within one another, a mounting for said body sections constraining certain of them to move along the vehicle chassis and securing one of them against movement, a number of hydraulic rams arranged side by side, certain of which body sections has a part of each of two hydraulic rams secured to it, which two rams are arranged to apply thrusts to said body section in the same sense thereby preventing a turning movement on the body section.

8. A vehicle having a telescopic body comprising three body sections adapted to nest within one another, a mounting for such body sections constraining two of them to move along the vehicle while securing the third against movement, a number of hydraulic rams arranged side by side and symmetrically disposed with respect to the fore-and-aft central vertical plane through said body sections and having a part of each of them secured to the middle movable body section, while the other parts are so connected to the chassis and the other movable body section that the resultant thrusts in these various parts are in said vertical plane.

9. A vehicle having a telescopic body comprising three body sections adapted to nest within one another, a mounting for such body sections constraining two of them to move along the vehicle chassis while securing the third against movement, three hydraulic rams arranged side by side with the axis of the central ram lying in a central fore-and-aft vertical plane through said body and with the axes of the others symmetrically disposed on either side of said plane, a part of each of which three rams is secured to the middle movable body section while the center of the other three parts of the rams and the two outer parts are connected to the other movable body sections and to a fixed part of the vehicle.

10. A vehicle having a telescopic body comprising three body sections adapted to nest within one another, a mounting for said body sections constraining two of them to move along the vehicle chassis while securing the third against movement, three hydraulic rams arranged side by side with a part of each of them secured to the middle movable body symmetrically with respect to a fore-and-aft vehicle plane passing through said body sections and having the other part of the central one connected to the other movable body section and the other parts of the other two rams connected to a fixed part of the vehicle.

11. A vehicle having a telescopic body comprising three body sections adapted to nest within one another, a mounting for said body sections constraining two of them to move along the vehicle chassis while securing the third against movement, three hydraulic rams arranged side by side and disposed symmetrically with respect to a central vertical plane through the body sections and having the three cylinders secured to the central body section and the piston of the center cylinder connected to the other movable body section and the other two pistons secured to a fixed part of the vehicle.

ERNEST THOMAS JAMES TAPP.

REFERENCES CITED

The following references are of record in the file of this patent:

UNITED STATES PATENTS

| Number | Name | Date |
|---|---|---|
| 725,033 | Brigham | Apr. 14, 1903 |
| 1,589,687 | Greene | June 22, 1926 |
| 1,891,885 | Tapp et al. | Dec. 20, 1932 |
| 2,339,360 | Sicard | Jan. 18, 1944 |

FOREIGN PATENTS

| Number | Country | Date |
|---|---|---|
| 182,433 | Great Britain | Mar. 8, 1923 |